(12) United States Patent
Rengasamy

(10) Patent No.: US 6,676,143 B2
(45) Date of Patent: Jan. 13, 2004

(54) MODULAR SUSPENSION ARM ASSEMBLY

(75) Inventor: Srinivasa P. Rengasamy, Heath, OH (US)

(73) Assignee: Meritor Heavy Vehicle Technology, LLC, Troy, MI (US)

( * ) Notice: Subject to any disclaimer, the term of this patent is extended or adjusted under 35 U.S.C. 154(b) by 64 days.

(21) Appl. No.: 09/967,427

(22) Filed: Sep. 28, 2001

(65) Prior Publication Data

US 2003/0062702 A1 Apr. 3, 2003

(51) Int. Cl.⁷ ................................................ B60G 3/12
(52) U.S. Cl. ...................... 280/124.128; 280/124.133; 280/124.153; 280/124.1
(58) Field of Search .................. 280/124.128, 124.133, 280/124.148, 124.153, 677, 678

(56) References Cited

U.S. PATENT DOCUMENTS

| | | | | | |
|---|---|---|---|---|---|
| 2,403,833 A | * | 7/1946 | Spangler | ...................... | 280/677 |
| 3,528,680 A | * | 9/1970 | Nelson | ........................ | 280/678 |
| 3,960,388 A | * | 6/1976 | Strader et al. | ......... | 280/86.757 |
| 4,223,904 A | * | 9/1980 | McColl | ....................... | 280/677 |
| 4,541,653 A | * | 9/1985 | Raidel | ................. | 280/124.116 |
| 4,763,923 A | * | 8/1988 | Raidel | ................. | 280/124.116 |
| 5,002,305 A | * | 3/1991 | Raidel | ................. | 280/124.116 |
| 5,039,124 A | * | 8/1991 | Widmer | ....................... | 280/678 |
| 5,667,240 A | * | 9/1997 | Mitchell | .............. | 280/124.131 |
| 5,690,353 A | * | 11/1997 | Vandenberg | ......... | 280/124.116 |
| 6,073,947 A | * | 6/2000 | Gottschalk et al. | ... | 280/124.128 |
| 6,508,482 B2 | * | 1/2003 | Pierce et al. | .......... | 280/124.116 |

* cited by examiner

Primary Examiner—Eric Culbreth
(74) Attorney, Agent, or Firm—Carlson, Gaskey & Olds

(57) ABSTRACT

A heavy-duty vehicle suspension assembly is provided that includes an axle assembly having opposing suspension arm mounting faces. A pair of modular suspension arm assemblies are secured to the axle assembly with the suspension arm assemblies extending outwardly from the axle assembly in opposite directions from one another. Each suspension arm assembly includes a first arm portion having a first end secured to the mounting face and extending to a second end. A second arm portion is secured to the second end and has a spring seat with a spring supported on each of the spring seats of the suspension arm assemblies for damping forces transmitted through the axle assembly. The first and second arm portions include mounting surfaces that overlap one another in a plurality of positions to permit the arm portions to be secured to one another in a plurality of configurations that accommodate numerous spring heights and pinion angles. The first and second arm portions may be constructed as separate castings. Once the desired spring height and pinion angle have been determined, the arm portions are oriented relative to one another in a configuration to obtain the desired spring height and pinion angle. The arm portions are secured to one another to retain the arm portions in the configuration, such as by drilling holes and using fasteners to secure the arm portions to one another.

14 Claims, 2 Drawing Sheets

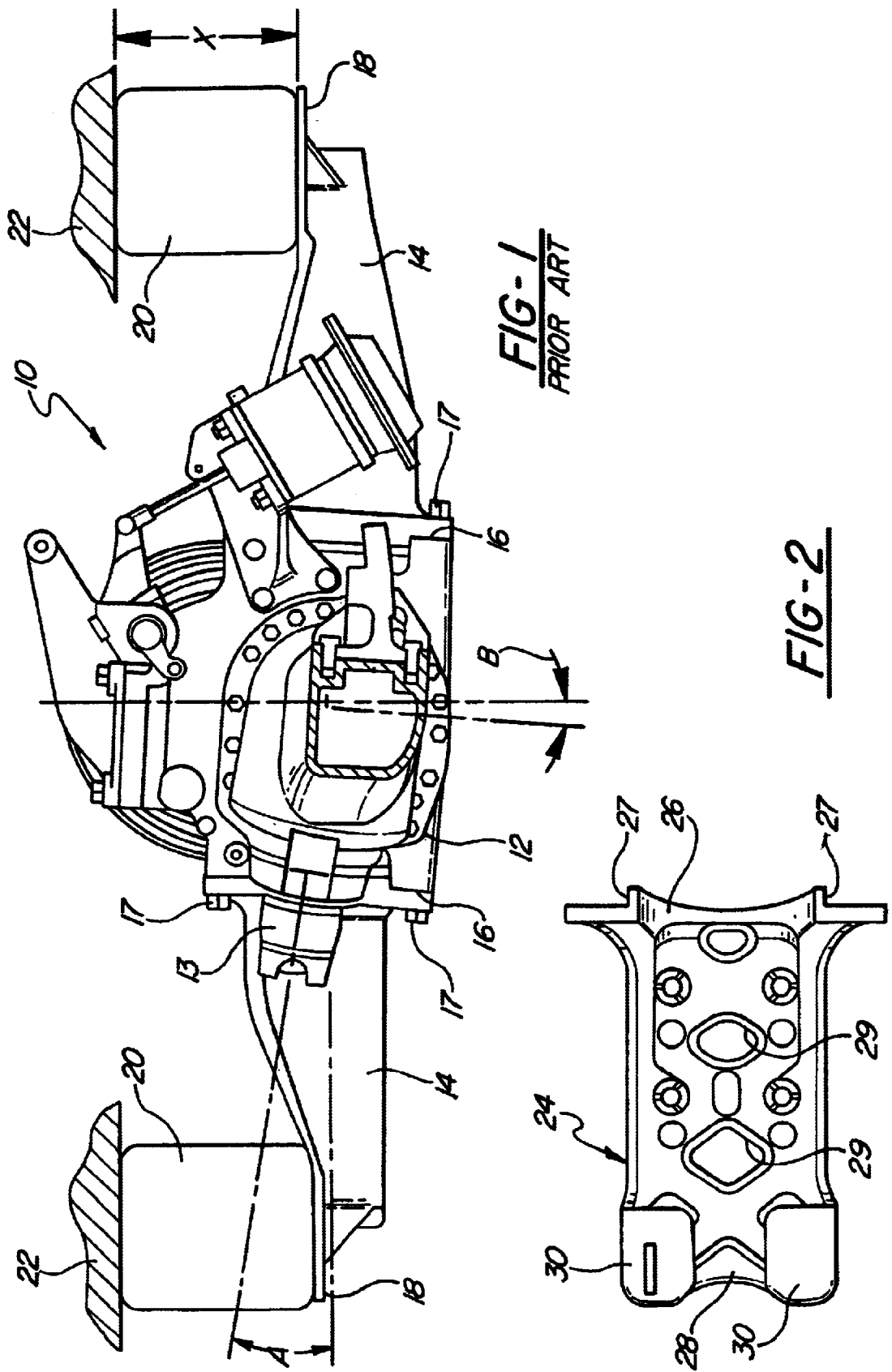

MODULAR SUSPENSION ARM ASSEMBLY

BACKGROUND OF THE INVENTION

This invention relates to a suspension arm assembly for a heavy duty vehicle with air suspension, and more particularly, the invention relates to a modular suspension arm assembly suitable for various spring heights and pinion angles.

Suspension assemblies supporting an axle assembly are connected to a vehicle frame by suspension arms. For heavy duty vehicle air suspension assemblies, particularly, for coach and bus applications, numerous suspension arms are used to increase stability to the vehicle and improve ride characteristics. In places where suspension arms are used, typically one is required at each "corner" of the axle assembly. Usually, the drive input for bus and coach application is at an angle and to accommodate this, the axle is tilted to the required angle, but the pads where the airbags are mounted are at the same height from the ground. As a result, up to four unique castings may be required for a particular suspension assembly.

The suspension arms define a spring height and pinion angle for the suspension assembly. Bus and coach vehicles typically require more than one spring height and more than one pinion angle. Typically, the pinion angle is given when the axle is tilted to achieve the required pinion angle. As a result, the suspension arm mounted at the front and rear of the axle have an angle and a height difference. Current technology requires a saint air bag pad height to achieve this. Accordingly, numerous castings for the suspension arms are required for the different suspension assemblies, in addition to the different castings for each suspension assembly, which greatly increase the cost of the suspension assembly. Therefore, what is needed is a modular suspension arm assembly that is suitable for accommodating various spring heights and pinion angles.

SUMMARY OF THE INVENTION AND ADVANTAGES

The present invention provides a heavy-duty vehicle suspension assembly including an axle assembly having opposing suspension arm mounting faces. A pair of modular suspension arm assemblies are secured to the axle assembly with the suspension arm assemblies extending outwardly from the axle assembly in opposite directions from one another. Each suspension arm assembly includes a first arm portion having a first end secured to the mounting face and extending to a second end. A second arm portion is secured to the second end and has a spring seat with a spring supported on each of the spring seats of the suspension arm assemblies for damping forces transmitted through the axle assembly. The first and second arm portions include mounting surfaces that overlap one another in a plurality of positions to permit the arm portions to be secured to one another in a plurality of configurations that accommodate numerous spring heights and pinion angles.

The first and second arm portions may be constructed as separate castings. Once the desired spring height and pinion angle have been determined, the arm portions are oriented relative to one another in a configuration to obtain the desired spring height and pinion angle. The arm portions are secured to one another to retain the arm portions in the configuration, such as by drilling holes and using fasteners to secure the arm portions to one another.

Accordingly, the present invention provides a modular suspension arm assembly that is suitable for accommodating various spring heights and pinion angles.

BRIEF DESCRIPTION OF THE DRAWINGS

Other advantages of the present invention can be understood by reference to the following detailed description when considered in connection with the accompanying drawings wherein:

FIG. 1 is a side elevational view of a prior art suspension assembly;

FIG. 2 is a first arm portion of the present invention;

DETAILED DESCRIPTION OF THE PREFERRED EMBODIMENT

Figure 3:
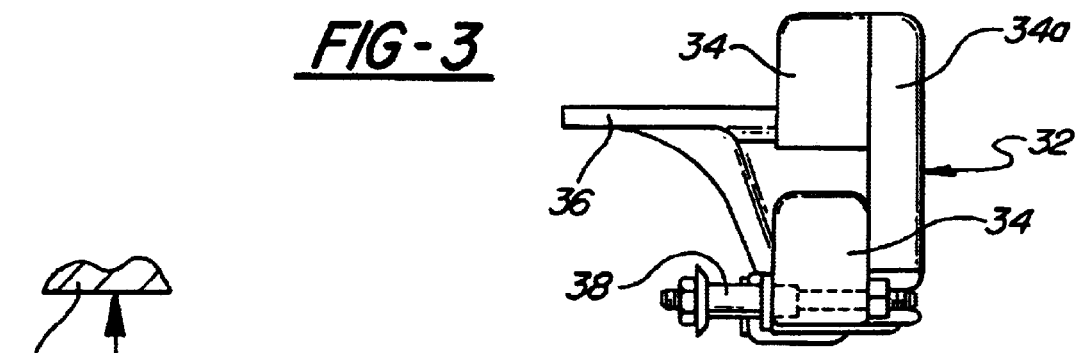
FIG. 3 is a side elevational view of a second arm portion of the present invention.

A prior art suspension assembly 10 is shown in FIG. 1. The suspension assembly 10 shown is typically utilized in heavy-duty vehicle applications such as coach and bus vehicles. However, it is to be understood that the suspension arms of the present invention may be used in other suspension applications. The suspension assembly 10 includes an axle assembly 12 having suspension arms 14 connected to mounting faces 16 by fasteners 17. Only two suspension arms 14 are shown for clarity. Typically, an axle assembly 12 for a coach and bus application will utilize four suspension arms 14 to provide increased stability and improved ride handling characteristics.

Depending upon the particular application, the axle assembly 12 is oriented in such a manner to obtain a desired pinion angle A defined by the carrier assembly 13. The mounting faces 16 are arranged on an axle assembly 12 to obtain a particular mounting angle B corresponding to a pinion angle A. That is, as the mounting angle B is changed by attaching a particular suspension arm 14 to the axle assembly 12 a particular pinion angle A will result. Said another way, as the pinion angle A changes so does the mounting angle B. To obtain the right spring height a different suspension arm 14 may have to be used. The axle assembly 12 is oriented to obtain a desired spring height X. The suspension arms 14 include spring seats 18 for supporting air springs 20 arranged between the vehicle frame 22 and the suspension assembly 10, which define the spring height X.

In the prior art, several castings for suspension arms 14 were necessary for each pinion angle A and spring height X configuration. When a different pinion angle A or spring height X was desired, new castings were required for the suspension arms 14, which added significant cost to the suspension assembly 10. These suspension arms 14 have either been made from cast steel or ductile iron. When made from cast steel, brackets or plates can be welded to a bare arm to obtain the desired spring height X for a given pinion angle A. Welding takes time and money. When the suspension arms are made from ductile iron a separate casting is required for different spring heights X and different pinion angles A. The present invention utilizes a multi-piece suspension arm that provides flexibility in that the same pieces may be used to achieve multiple configurations providing different spring heights and pinion angles.

The present invention utilizes a first arm portion 24, shown in the FIG. 2, and a second arm portion 32, shown in FIG. 3, that are secured to one another to achieve a particular configuration. Referring to FIG. 2, the first arm portion 24 includes a first end 26 having lips 27 used in locating the first arm portion 24 relative to the axle assembly 12, as in the prior art. The first arm portion 24 extends from the first end 26 to a second end 28 and may include apertures 29 for lightening the casting and reducing the weight. First arm portion 24 includes first mounting surfaces 30 that are defined by flat areas or pads, which are used to secure the first 24 and second 32 arm portions together, as well as discussed in more detail below. Referring to FIG. 3, the second arm portion 32 includes a spring seat 36 and second mounting surfaces 34 that are flat areas or pads which overlap the first mounting surfaces 30 when the first 24 and second 32 arm portions are secured to one another. The second portion 32 may include a shock absorber mount 38, if desired. Also, 32 can have multiple mounting faces at different angles so that the same casting can be used on all four corners of the axle. For example, in addition to surface 34 the second arm portion 32 may include a surface 34a for use in securing the arm portions 24, 32 together. In this manner, a casting made for a particular angle can be machined to obtain a different angle.

FIGS. 2 and 3 illustrate the first 24 and second 32 arm portions prior to assembly in a particular configuration. The first 24 and second 32 arm portions initially do not include any holes for securing the arm portions 24 and 32 to one another. However, it is to be understood that the arm portions 24 and 32 may include several hole patterns that may be used to achieve multiple configurations having different spring heights and pinion angles. Alternatively, holes may be drilled for a particular configuration only.

Figure 4:
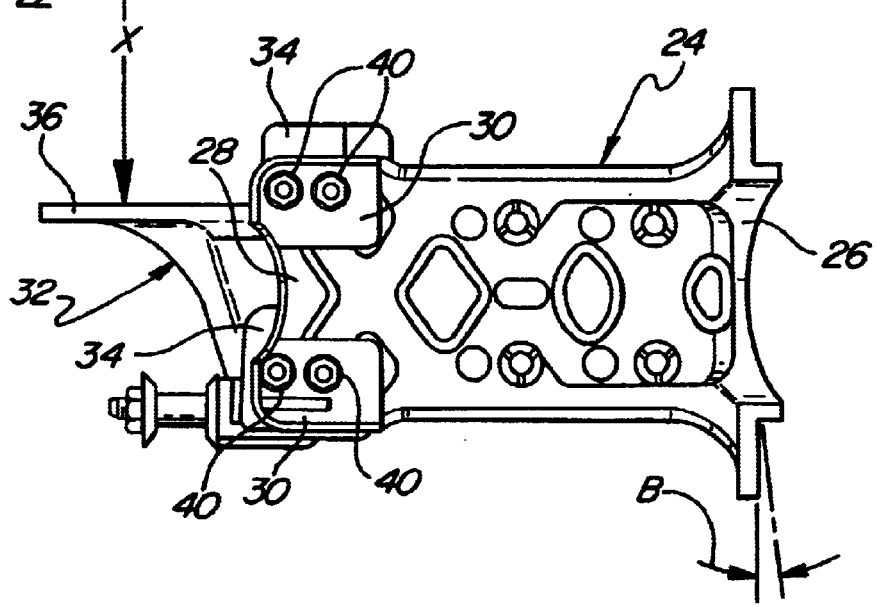
FIG. 4 is the suspension arm assembly of the present invention in a configuration providing a spring height and a pinion angle.
Figure 5:
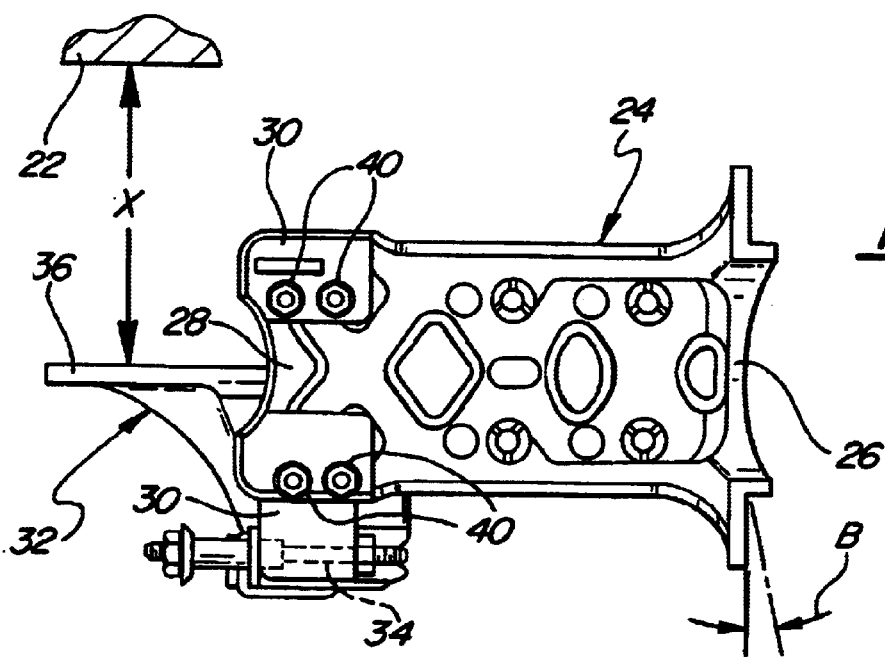
FIG. 5 is a side elevational view of another configuration of the suspension arm assembly of the present invention providing the same spring height as shown in FIG. 4 but for a different pinion angle.

One configuration for the suspension arm assembly of the present invention is shown in FIG. 4. The first arm portion 24 is oriented relative to the second arm portion 32 to achieve a configuration indicative of a desired spring height X and pinion angle that corresponds to mounting angle B. The first and second portions 24 and 32 are secured to one another, preferably by drilling holes through the arm portions and securing them to one another by fasteners 40, which may include cap screws, bolts and nuts, dowels, or any other suitable fastener. Another configuration is shown in FIG. 5 indicative of the same spring height X and a different pinion angle corresponding to a different mounting angle B. The first and second portions 24 and 32 may again be oriented relative to one another to achieve the desired configuration. Holes may then be drilled and the arm portions fastened to one another using fasteners 40. In this manner, the same first and second arm portions 24 and 32 may be used to achieve different configurations, as opposed to requiring unique castings as in the prior art.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A heavy-duty vehicle suspension assembly comprising:
   an axle assembly having opposing suspension arm mounting faces;
   a pair of modular suspension arm assemblies with said suspension arm assemblies extending outwardly from said axle assembly in opposite directions from one another, each suspension arm assembly comprising a first arm portion having a first end secured to said mounting face and extending to second end, and a second arm portion secured to said second end and having a spring seat; and
   a spring supported on each of said spring seats for damping forces transmitted through said axle assembly.

2. The suspension assembly according to claim 1, wherein said first and second arm portions include first and second mounting surfaces, respectively, with said surfaces overlapping one another in a plurality of positions to permit said arm portions to be secured to one another in a plurality of configurations.

3. The suspension assembly according to claim 2, wherein said plurality of configurations includes a plurality of spring heights.

4. The suspension assembly according to claim 2, wherein said plurality of configurations includes a plurality of pinion angles.

5. The suspension assembly according to claim 1, wherein said arm portions are constructed from ductile iron.

6. The suspension assembly according to claim 1, wherein said second arm portion includes a shock absorber mount.

7. A modular suspension arm assembly comprising:
   a first arm portion having a first end adapted to be secured to an axle assembly and extending to second end;
   a second arm portion secured to said second end and having a spring seat for supporting a spring; and
   wherein said first and second arm portions include first and second mounting surfaces respectively with said surfaces overlapping one another in a plurality of positions to permit said arm portions to be secured to one another in a plurality of configurations and wherein said plurality of configurations includes a plurality of spring heights.

8. A modular suspension arm assembly comprising:
   a first arm portion having a first end adapted to be secured to an axle assembly and extending to second end;
   a second arm portion secured to said second end and having a spring seat for supporting a spring; and
   wherein said first and second arm portions include first and second mounting surfaces, respectively with said surfaces overlapping one another in a plurality of positions to permit said arm portions to be secured to one another in a plurality of configurations, and wherein said plurality of configurations includes a plurality of pinion angles.

9. The suspension arm assembly according to claim 8, wherein said arm portions are constructed from ductile iron.

10. The suspension arm assembly according to claim 8, wherein said second arm portion includes a shock absorber mount.

11. A method for manufacturing a modular suspension arm assembly, comprising the steps of:
    a) providing a first arm portion and a second arm portion with a spring seat;
    b) determining a desired spring height;
    c) determining a desired pinion angle;
    d) orienting the first arm portion relative to the second arm portion in a configuration to obtain the desired spring height and pinion angle; and
    e) securing the first and second arm portions together to retain the arm portions in the configuration.

12. The method according to claim 11, wherein step c) includes drilling holes through the first and second arm portions for the configuration and securing fasteners through the holes.

13. The method according to claim 11, wherein step a) includes casting the first and second arm portions using ductile iron.

14. The method according to claim 11, wherein step d) includes overlapping first and second mounting surfaces on the first and second arm portions, respectively, to the configuration.

* * * * *

UNITED STATES PATENT AND TRADEMARK OFFICE
CERTIFICATE OF CORRECTION

PATENT NO. : 6,676,143 B2
DATED : January 13, 2004
INVENTOR(S) : Rengasamy

It is certified that error appears in the above-identified patent and that said Letters Patent is hereby corrected as shown below:

<u>Column 4,</u>
Line 21, insert -- , -- before "respectively" and after "surfaces".
Lines 21 and 33, insert -- , -- before "with" and after "respectively".
Line 24, insert -- , -- before "and" and after "configurations".
Line 55, "step c)" should be -- step e) --

Signed and Sealed this

Fourth Day of May, 2004

JON W. DUDAS
*Acting Director of the United States Patent and Trademark Office*